(12) United States Patent
Thut

(10) Patent No.: US 8,333,921 B2
(45) Date of Patent: Dec. 18, 2012

(54) SHAFT COUPLING FOR DEVICE FOR DISPERSING GAS IN OR PUMPING MOLTEN METAL

(76) Inventor: Bruno H. Thut, Chagrin Falls, OH (US)

(*) Notice: Subject to any disclaimer, the term of this patent is extended or adjusted under 35 U.S.C. 154(b) by 249 days.

(21) Appl. No.: 12/942,361

(22) Filed: Nov. 9, 2010

(65) Prior Publication Data

US 2011/0262213 A1 Oct. 27, 2011

Related U.S. Application Data

(63) Continuation-in-part of application No. 12/767,934, filed on Apr. 27, 2010, now abandoned.

(51) Int. Cl.
*C21C 7/00* (2006.01)

(52) U.S. Cl. ......... 266/287; 266/217; 266/235; 266/239

(58) Field of Classification Search .................... 266/45, 266/217, 235, 239, 287; 222/603
See application file for complete search history.

(56) References Cited

U.S. PATENT DOCUMENTS

| | | | |
|---|---|---|---|
| 4,954,167 A | 9/1990 | Cooper | |
| 6,589,313 B2 | 7/2003 | Bilodeau et al. | |
| 6,689,310 B1 | 2/2004 | Cooper | |
| 7,507,365 B2 * | 3/2009 | Thut | 266/235 |
| 7,534,284 B2 | 5/2009 | Thut et al. | |
| 7,687,017 B2 * | 3/2010 | Thut | 266/45 |

* cited by examiner

Primary Examiner — Scott Kastler
(74) Attorney, Agent, or Firm — Pearne & Gordon LLP

(57) ABSTRACT

A coupling assembly includes a motor driven drive shaft. A rotatable refractory shaft is adapted to be connected to a rotor. Locking recesses are formed in an upper end of the refractory shaft. A rotatable coupling includes a body and a device for affixing the drive shaft to the body. Lever arms are fastened to the body and can be pivoted. A recess in the body receives the refractory shaft. Openings in the body extend from an exterior surface of the body to the recess. Each of the lever arms includes a protruding locking member positioned in the opening in the body. Each locking member engages a locking recess. A device exerts a force against the lever arms forcing the locking members into the locking recesses.

27 Claims, 9 Drawing Sheets

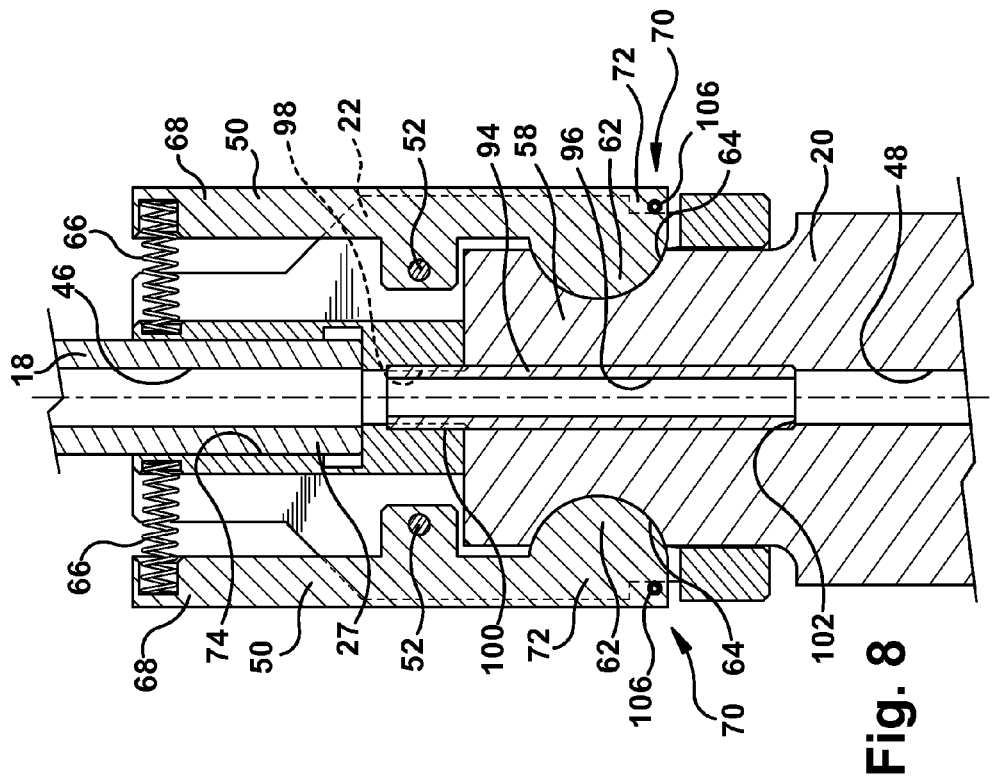
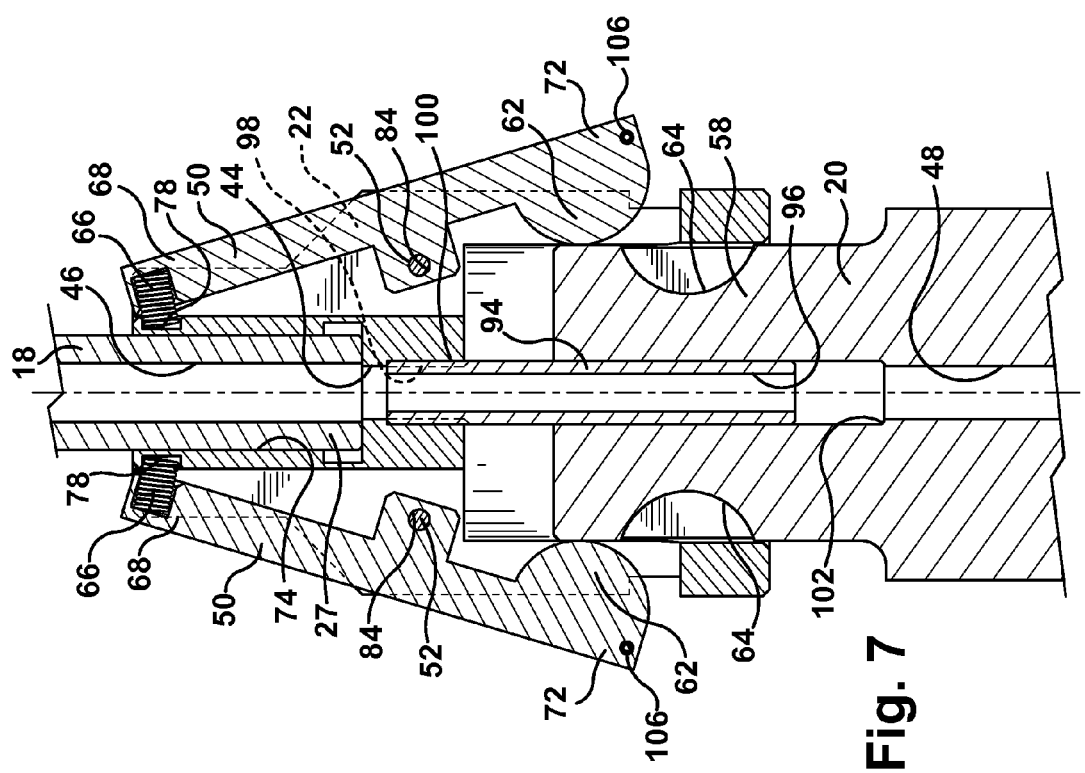

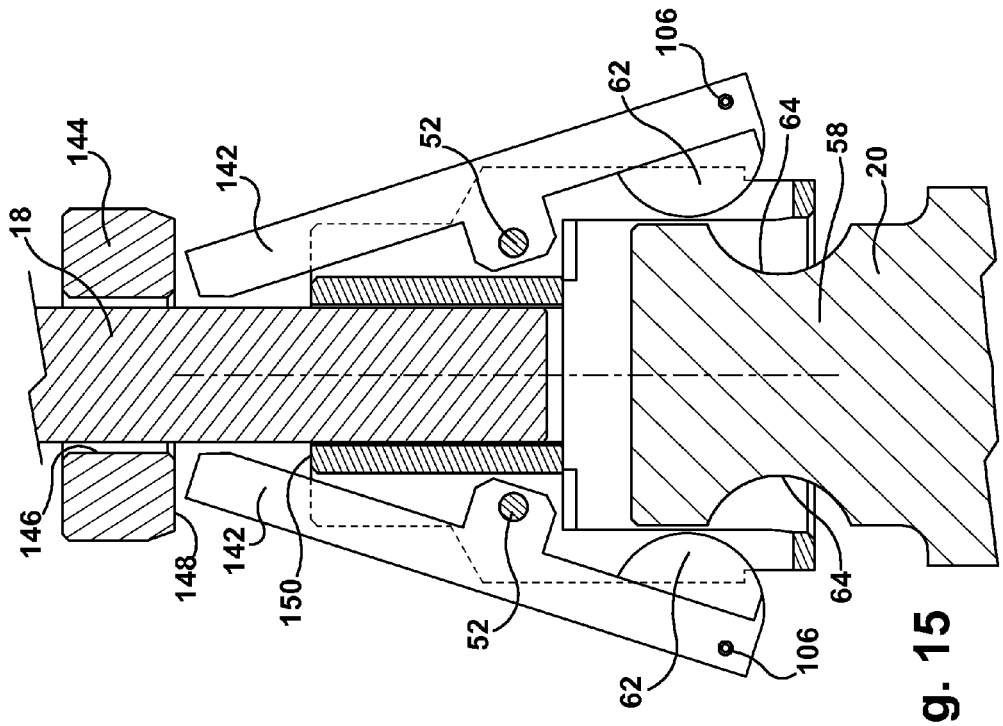
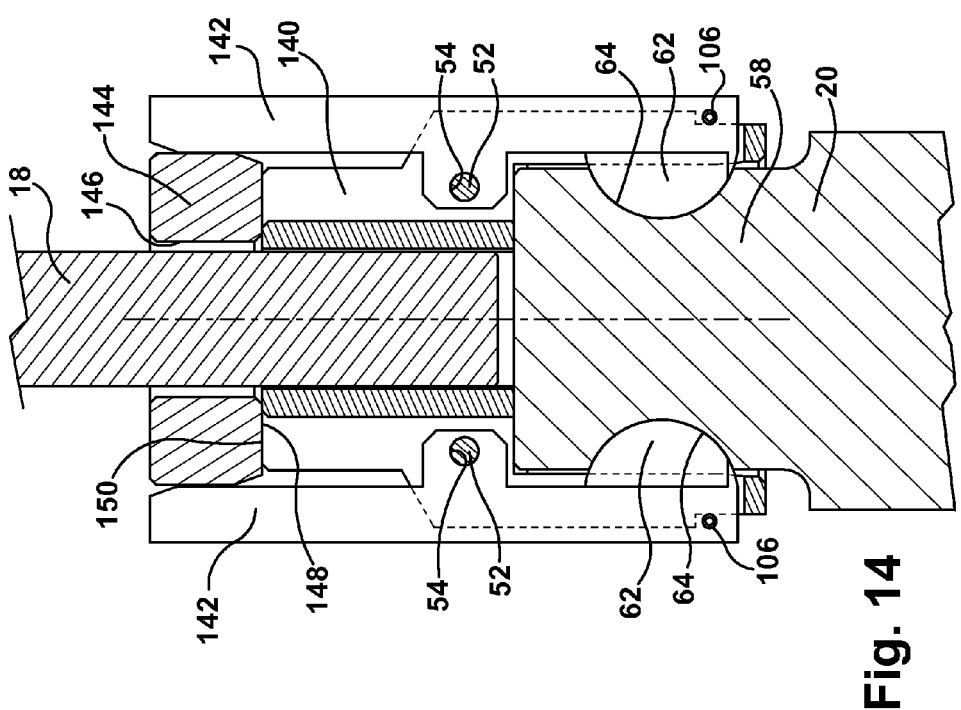

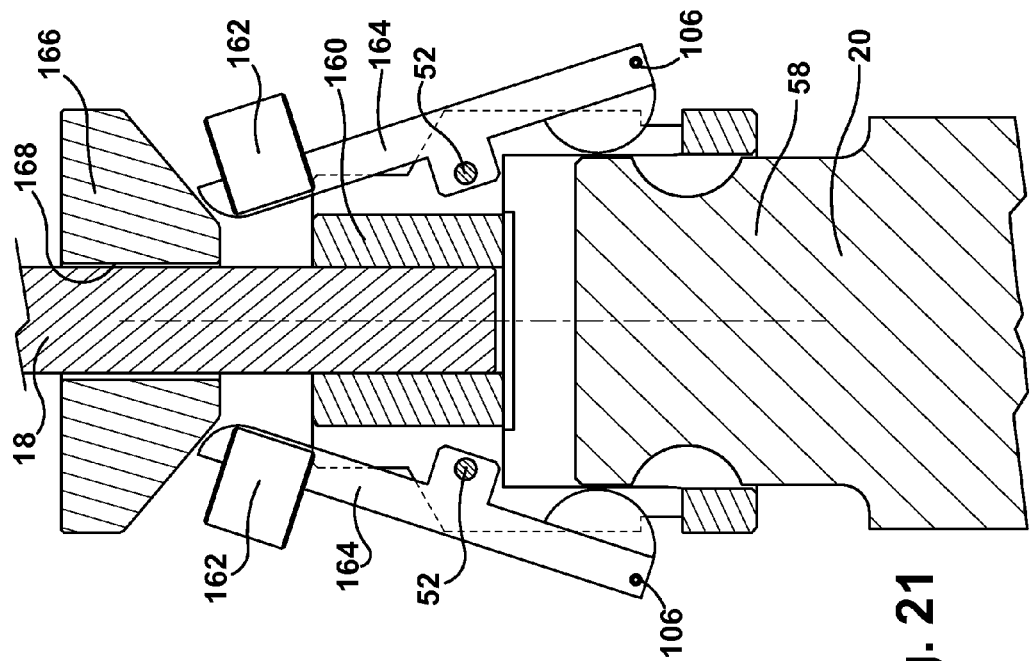
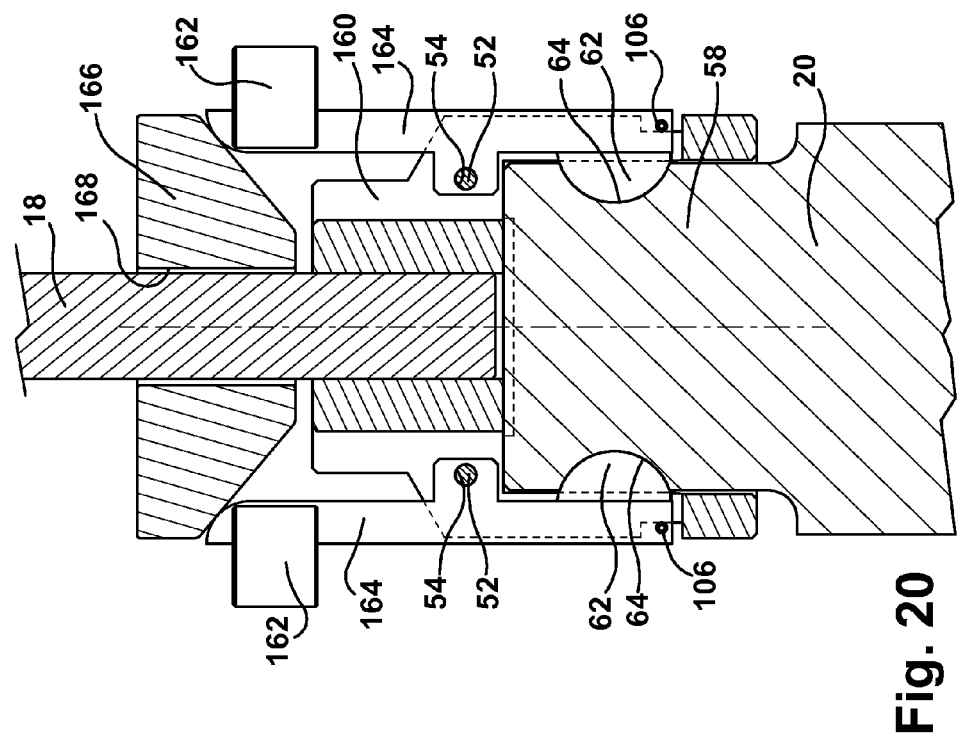

SHAFT COUPLING FOR DEVICE FOR DISPERSING GAS IN OR PUMPING MOLTEN METAL

RELATED APPLICATION

This patent application is a continuation-in-part of U.S. patent application Ser. No. 12/767,934, filed Apr. 27, 2010 now abandoned, which is incorporated herein by reference in its entirety.

FIELD OF THE INVENTION

This disclosure pertains to assemblies for coupling a motor driven drive shaft to a refractory shaft in devices for dispersing gas in or pumping molten metal.

BACKGROUND

In the course of processing molten metals it is sometimes beneficial to treat the molten metal with gas. For example, gases such as nitrogen and argon are introduced into molten aluminum and alloys thereof to remove undesirable constituents such as hydrogen gas and non-metallic inclusions. Chlorine gas is introduced into molten aluminum and alloys thereof to remove alkali metals, such as magnesium. The gases added to the molten metal can chemically react with the undesired constituents to convert them to a form (such as a precipitate or a dross) that separates or can be separated from the molten metal.

As disclosed in U.S. Pat. Nos. 6,689,310 and 4,954,167 the gas can be dispersed in the molten metal using a device that includes a refractory shaft having a passageway through it connected to a rotor or impeller at its lower end. The gas travels through one or more openings of the rotor. The rotor can be configured to improve the distribution of the gas such as by more finely dividing gas bubbles. A motor rotates the refractory shaft. A gas source introduces gas into the refractory shaft.

U.S. Pat. No. 6,589,313 discloses a hollow shaft on the end of which is an impeller. The shaft and impeller are rotated and positioned at an angle relative to the bath by a complex apparatus. Solid flux and gas are added to the rotating shaft and dispersed in the molten metal.

TECHNICAL SUMMARY

A coupling assembly is used for coupling a drive shaft and refractory shaft. A drive shaft has an upper end and a lower end and is adapted to be rotated by a motor at the upper end. The drive shaft may or may not have a passageway extending through it. A rotatable refractory shaft has an upper end and a lower end. The lower end of the refractory shaft is adapted to be connected to a rotor or impeller that may or may not have passageways for distributing gas into the molten metal. Locking recesses are formed in the upper end of the refractory shaft. The refractory shaft is formed of refractory material and may or may not have a passageway extending through it. A rotatable coupling comprises a body having an exterior surface, an upper end and a lower end. There is a means or device for affixing the lower end of the drive shaft to the upper end of the body. Lever arms are fastened to the body. Pivots are disposed in the body about which the lever arms can be pivoted. A recess or socket in the body at its lower end is adapted for receiving the upper end of the refractory shaft. Openings of the body extend from the exterior surface to the recess. Each of the lever arms includes a protruding locking member positioned in the opening in the body. Each of the locking members is adapted to engage one of the locking recesses of the refractory shaft. The locking member and recess can have a complementary shape such as arcuate or rectangular shape. A device exerts a force against the lever arms forcing the locking members into the locking recesses when the lever arms are pivoted.

In one embodiment, the device that exerts the force against the lever arms includes an annular weight member disposed around the drive shaft in contact with the upper ends of said lever arms. The weight member may be all that is needed to force the lever arms outward at their upper ends if the annular weight has a size that approximates the distance between the upper ends of the lever arms in their outermost positions.

In another embodiment of the device that exerts the force against the lever arms, in addition to use of an annular weight member around the drive shaft between the ends of the lever arms, the coupling assembly may include a weight member disposed on an upper end of each of the lever arms remote from the locking members. Each end of the lever arms can include an arcuate surface and the annular weight member can include a sloped surface in contact with the arcuate surfaces of the lever arms.

In another embodiment of the device that exerts the force against the lever arms, springs are disposed between the upper end of the body and upper ends of the lever arms and bias the locking members of the lever arms into the recess. Movement of the locking members out of the recess acts against the force of the springs.

As used herein, the term "molten metal" means any metal in liquid form, such as aluminum, copper, iron, zinc and alloys thereof, which can be purified with gas or that otherwise has gas mixed with it. The term "gas" means any gas or combination of gases, including argon, nitrogen, chlorine, fluorine, freon, and helium, that are mixed with molten metal.

Regarding more specific features, there is a means for affixing the lower end of the drive shaft to the upper end of the body. A bore is formed in the upper end of the body dimensioned to receive the drive shaft. A keyway is formed in one of the drive shaft and the body. A key fits into the keyway formed in the other of the drive shaft and the body. Set screws in the body extend into contact with the drive shaft. For example, the lower end of the drive shaft could include a key and the body could include a keyway extending outwardly from the bore, which receives the key. The drive shaft is inserted into the bore and the key fits into the keyway. Then, the set screws can be tightened to apply a retaining force against the drive shaft preventing movement of the drive shaft and the coupling while the drive shaft rotates the coupling.

As to further specific features, the body can have a lower cylindrical section and an upper cylindrical section, the lower section having a larger diameter than the upper section. The pivots are disposed in the lower section of the body. The locking member can be a Woodruff key (e.g., in a semicircular shape) and the locking recess can be configured to receive the Woodruff key. Stop members can each be adapted to limit movement of one of the lever arms into the recess. The stop members can comprise a flat portion formed in the exterior surface of the body and a pin extending through a lower end of each of the arms that engages the flat portion. The body can comprise a central opening aligned with the passageways in the drive shaft and the refractory shaft. A hollow rod can be fastened to the body extending in the recess in alignment with the central opening. The rod is received in the passageway of the refractory shaft.

Another aspect can feature a device that includes the aforementioned coupling assembly. Also included is a motor connected to the drive shaft. Structure suspends the motor above the molten metal. A rotor is connected to the lower end of the refractory shaft. A gas source can provide gas that travels down the drive shaft, through the coupling, down the refractory shaft and is distributed by openings of the impeller or rotor into the molten metal.

Moreover, a rotary union can be fastened to the drive shaft. It comprises a casing. A rotatable member has a gas passageway and is connected to the upper end of the drive shaft. Bearings rotatably support the rotatable member in the casing. A seal at an upper end of the rotatable member prevents gas from traveling outside of the rotatable member. An opening in the casing enables introducing gas into the casing into the passageway of the rotatable member.

Another embodiment of this disclosure features a coupling assembly for coupling the drive shaft and the refractory shaft used to introduce gas into molten metal. The coupling assembly includes the above basic features in addition to the following specific features. The drive shaft includes a passageway therethrough and the refractory shaft includes a passageway therethrough. A hollow rod can be fastened to the body extending in the recess in communication with a central opening through the coupling body. The rod is received in the passageway of the refractory shaft. This can help to seat the refractory shaft in the recess and to prevent leaks of the gas through the coupling. Also included can be the device for introducing gas into molten metal described above comprising the coupling assembly, a motor, structure for suspending the motor above the molten metal, the rotor and the gas source. Another feature can be the rotary union described above.

Many additional features, advantages and a fuller understanding of the invention will be had from the accompanying drawings and the detailed description that follows. It should be understood that the above Technical Summary describes information of this disclosure in broad terms while the following Detailed Description describes information of this disclosure more narrowly and presents preferred embodiments that should not be construed as necessary limitations of the broad invention as defined in the claims.

BRIEF DESCRIPTION OF THE DRAWINGS

FIG. 7 is a vertical cross-sectional view showing a refractory shaft being inserted into a recess of the coupling;

FIG. 8 is a vertical cross-sectional view showing the refractory shaft fully inserted into the coupling in a locked position;

FIG. 14 is a vertical cross-sectional view showing the refractory shaft fully inserted into the coupling in a locked position;

FIG. 15 is a vertical cross-sectional view showing a refractory shaft being inserted into a recess of the coupling;

FIG. 20 is a vertical cross-sectional view showing the refractory shaft fully inserted into the coupling in a locked position; and FIG. 21 is a vertical cross-sectional view showing a refractory shaft being inserted into a recess of the coupling.

DETAILED DESCRIPTION

Figure 1:
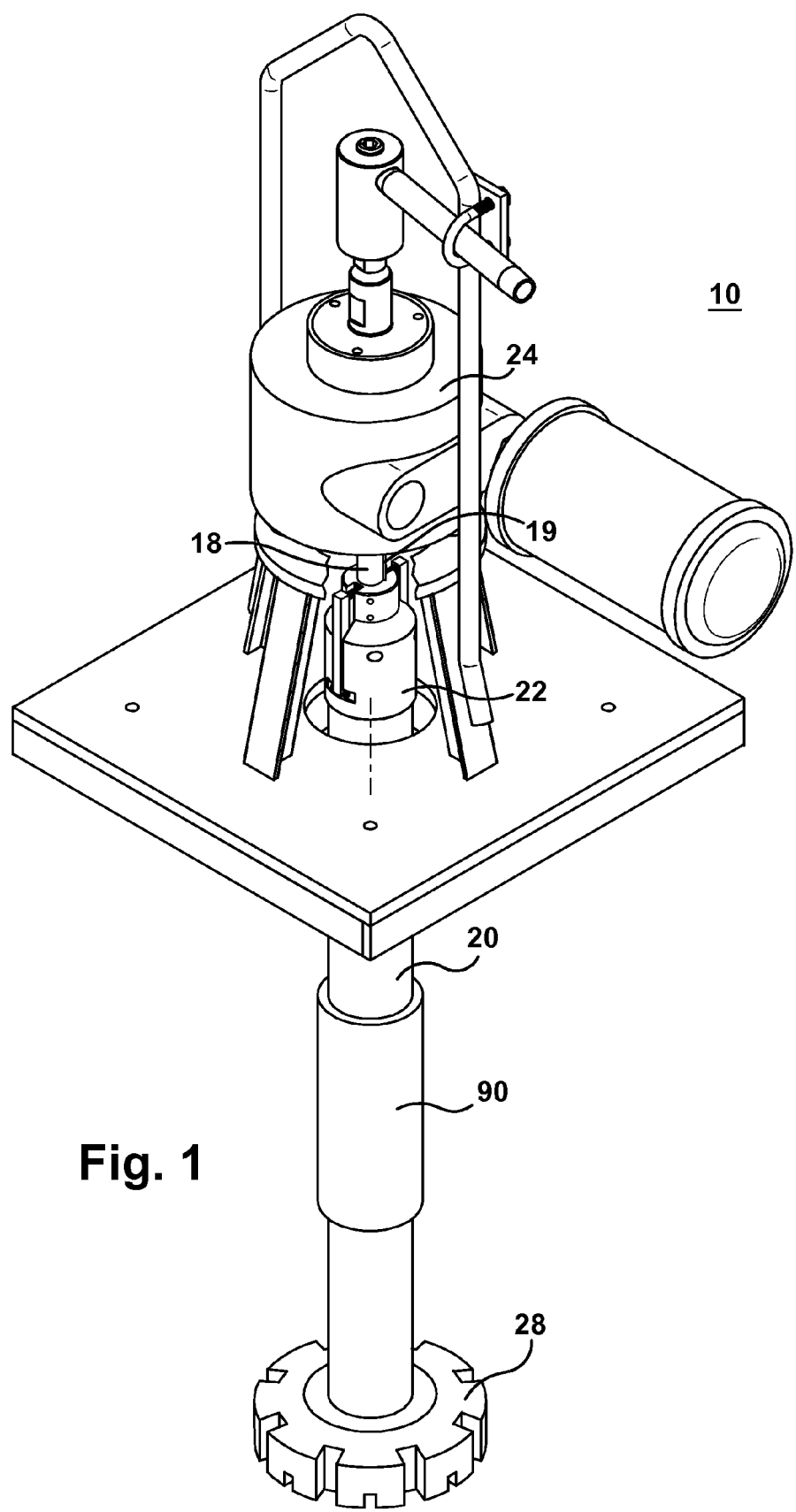
FIG. 1 is a perspective view of a device for dispersing gas in molten metal according to this disclosure.
Figure 2:
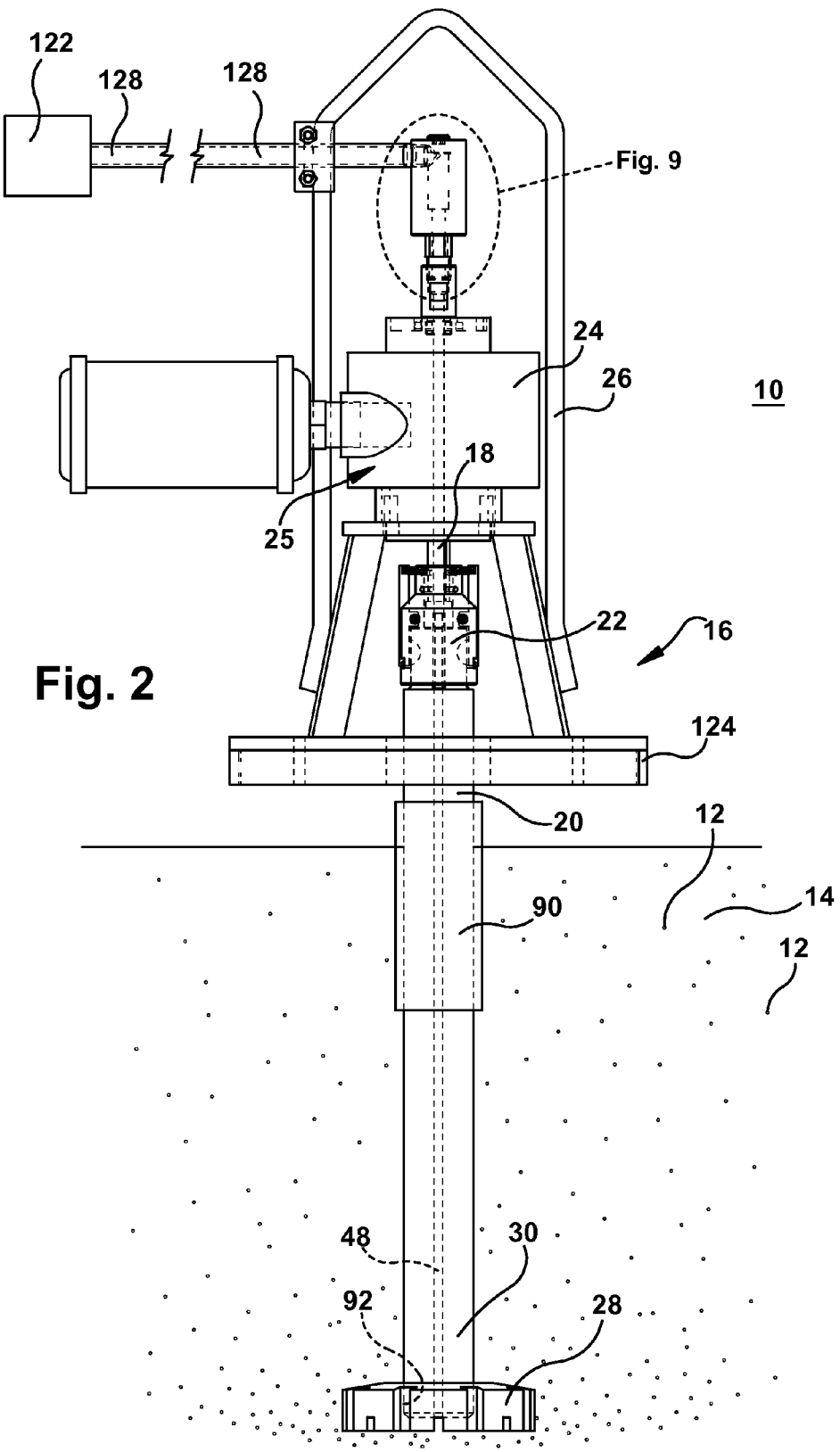
FIG. 2 is a front elevational view of the device of FIG. 1.

A gas dispersion device 10 is used for dispersing gas 12 into molten metal 14. The device includes a coupling assembly 16 that includes a drive shaft 18, a refractory shaft 20 and a coupling (in this case coupling 22) for connecting the drive shaft to the refractory shaft. A motor 24 is connected to an upper end 25 of the drive shaft. Structure 26 suspends the motor above the molten metal. An impeller or rotor 28 is connected to a lower end 30 of the refractory shaft. The motor 24 drives the drive shaft 18 to rotate the coupling 22, which rotates the refractory shaft 20 and the fastened rotor 28 in the molten metal.

The coupling 22 comprises a body 32 having an exterior surface 34, an upper end 36, a lower end 38, a lower cylindrical section 40 and an upper cylindrical section 42. The lower section 40 has a larger diameter than the upper section 42. A central opening 44 in the body 32 is in communication with passageways 46, 48 in the drive shaft and the refractory shaft, respectively. Lever arms 50 extend along a length of the body. Pivots 52 are disposed in the lower section 40 of the body 32 about which the lever arms 50 can be pivoted. Threaded openings 54 are disposed in the body into which the threaded pivots 52 are received. A cylindrical recess or socket 56 in the lower end 38 of the body is adapted for receiving an upper end 58 of the refractory shaft 20. Rectangular shaped openings 60 in the upper and lower sections of the body extend from the exterior surface 34 to the recess 56. Each of the lever arms 50 includes a locking member 62 (e.g., a Woodruff key) positioned in one of the openings 60 in the body. Each of the Woodruff keys 62 is adapted to engage a locking recess 64 formed in the upper end 58 of the refractory shaft 20. Springs 66 located at the upper end 36 of the coupling body 32 bias the Woodruff keys into the recess 56 (i.e., into the locking recesses 64 formed in the refractory shaft 20) upon pivoting of the lever arms so as to prevent removal or downward movement of the refractory shaft 20 from the recess 56. One end of the springs 66 contacts the upper section 42 and the other end of the springs 66 contacts an upper end 68 of the lever arms 50. Stop members 70 are each adapted to limit movement of a lower end 72 of one of the lever arms 50 into the recess 56.

The upper cylindrical section 42 of the body includes a centrally located bore 74 and the keyway 76 extending from the bore. The upper cylindrical section 42 includes the diametrically opposed rectangular openings or slots 60 formed therein. A bore 78 is formed in each of the slots for seating an end of the spring 66. A bore 80 is also formed at the upper end 68 of the arms 50 for seating the other end of the spring. The spring is a compression spring.

The pivots 52 span the openings 60 in the body. The arms 50 have protruding portions 82 each with an opening 84 therethrough that receive one of the pivots 52. The protruding portions 82 of the arms extend in the opening 60 of the body.

Also included is means for fastening a lower end 27 of the drive shaft 18 to the upper end 36 of the body. The bore 74 is formed in the upper end 36 of the body and is dimensioned to receive the drive shaft 18. The lower end of the drive shaft includes a key (not shown) and the body includes a keyway 76 extending outwardly from the bore 74 that receives the key. The drive shaft is formed of metal, for example, steel. The coupling 22 is also formed of metal, for example, steel. The drive shaft is inserted into the bore 74 and the key on the drive shaft fits into the keyway 76 extending from the bore. Set screws 86 extending in threaded openings 88 from the exterior surface 34 of the upper section 42 of the body to the bore, contact the drive shaft 18. The set screws can be tightened to apply a retaining force against the drive shaft preventing movement of the drive shaft and the coupling while the drive shaft rotates the coupling.

The refractory shaft 20 can be made of graphite. It can include a sleeve 90 of refractory material at a location of the surface of the molten metal bath (e.g., a silicon carbide sleeve) to prevent wear caused by rotation of the shaft in oxides of the bath. The refractory shaft is threaded or cemented at the lower end for connection to the threads or central bore 92 of the rotor 28. The locking recesses 64 formed in the upper end of the refractory shaft can be considered to be a Woodruff keyway when the locking member 62 is in the form of a Woodruff key. When used as Woodruff keyways, each locking recess is in a semicircular shape corresponding to the semicircular shape of the Woodruff key.

A hollow rod 94 can be fastened to the body extending in the recess 56 of the coupling having a passageway 96 in alignment with the central opening 44. A threaded opening 98 in alignment with the central opening receives threads 100 on the rod. The diameter of the passageway 96 in the rod can, but does not need to, approximate the diameter of the passageway 46 in the drive shaft 18 and the diameter of the passageway 48 of the refractory shaft 20. The rod 94 is received in the passageway 48 at the upper end 58 of the refractory shaft 20. When fully inserted in the refractory shaft the rod can engage a shoulder 102 formed around the passageway 48 of the refractory shaft. The rod seats the refractory shaft in the recess.

Referring to FIG. 7, the coupling can employ one or more optional gaskets. One annular gasket can be located between the bottom of the drive shaft 18 and the flat horizontal interior surface of the coupling body it contacts. This can ensure that the gas only travels from the drive shaft passageway 46 into the central opening 44 in the body. Another annular gasket can be located between the upper end 58 of the refractory shaft and the flat horizontal surface of the body that it is near or contacts. This second gasket would be disposed so that the rod 94 extends through the opening of the gasket but is in contact with the gasket. The second gasket would prevent gas from traveling outside of the rod 94 into the recess 56 and would ensure that the gas only travels through the passageway 96 of the rod 94 into the passage 48 of the refractory shaft 20.

The stop members 70 can comprise a flat portion 104 formed in the exterior surface of the lower section 40. A pin 106 extends through a lower end of each of the arms and engages the flat portion. The flat portion is disposed on either side of the opening 60 and the pin can traverse the opening 60. This prevents the arms from entering the recess beyond the point where they are stopped by the engagement of the pins against the flats.

The force of the springs 66 pushes the upper ends 68 of the arms 50 away from the upper cylindrical section 42, pivoting the arms about the pivots 52 so that the locking members 62 are biased toward the lower cylindrical section 40 and extend in the recess 56. The stop members 70 prevent the locking members from protruding too far into the recess. The stop members act against the spring force on the arms that moves the lower ends of the arms into the recess. When the locking members 62 are moved out of the recess 56 upon insertion of the refractory shaft into the recess, the locking members move away from the lower cylindrical section 40, pivoting the arms about the pivots and moving the upper ends 68 of the arms 50 toward the upper cylindrical section 42 against the force of the springs. The spring force acts to resist this movement. Therefore, once the locking members 62 of the arms are aligned with the locking recesses 64 of the refractory shaft 20, the upper ends 68 of the arms 50 are moved away from the upper section 42 due to the spring force pivoting the arms about the pivots and moving the lower ends 72 of the arms 50 toward the recess 56 to seat the locking members 62 into the locking recesses 64. The force of the springs 66 must be resisted if the refractory shaft 20 is moved downward from the recess 56, which resists removal of the refractory shaft from the recess during ordinary operation of the device. The arcuate shape of the locking members 62 facilitates removal of the refractory shaft 20 from the coupling 22 when sufficient downward force is applied to the refractory shaft to overcome the spring force. That is, moving the refractory shaft downward against the arcuate locking member 62 in the arcuate recess cams the arms away from the recess and out of the locking recesses.

Another feature is a rotary union 108 fastened to the drive shaft 18. It comprises a casing 110. A rotatable member 112 has a gas passageway 114 and is fixedly connected to the upper end 25 of the drive shaft. Bearings 116 rotatably support the rotatable member 112 in the casing 110. A seal 118 at an upper end of the rotatable member prevents gas from traveling outside of the rotatable member. An opening 120 in the casing 110 enables gas to be introduced into the casing into the passageway 114 of the rotatable member 112.

A gas source 122 is used to provide gas along the passageway 46 of the drive shaft 18, through the opening 44 of the coupling 22, along the passageway 48 of the refractory shaft 20 and is dispersed by the rotor 28 in the molten metal 14. One example of a gas source is pressurized gas provided by a device disclosed in U.S. Pat. No. 7,534,284, which is incorporated herein by reference in its entirety. Various gases can be dispersed by the device into the molten metal as disclosed above, such as argon or nitrogen. Chlorine gas can also be dispersed by the device into the molten metal. Solids can be entrained by the gas for dispersal in the molten metal such as solid flux as disclosed in the U.S. Pat. No. 7,534,284.

To prepare for operation, either an air or electric motor 24 is provided. The motor 24 may be spaced above a motor mount 124 as shown. Or, no motor mount may be used. The support structure 26 can be fastened to the motor mount 124 or the motor 24 for suspending the device above the bath of molten metal bath 14. The rotary union 108 is positioned so that the rotatable member 112 is fixedly fastened to the upper end of the drive shaft. A conduit 128 extends from the opening of the casing 110 of the rotary union to the gas source 122, which is remote from the molten metal bath. The drive shaft 18 is fastened to the coupling 22 by moving the coupling so that the bore 74 and keyway 76 align with the drive shaft 18 and its key while the drive shaft is extending from the motor. The bore 74 is then positioned to receive the drive shaft so that the key engages the keyway 76. The set screws 86 are used to tighten the drive shaft to the coupling. This firmly couples the drive shaft 18 with the coupling 22 preventing radial or axial movement of the drive shaft relative to the coupling. The rotor 28 is fastened to the lower end of the refractory shaft 20 using a threaded connection between them. The refractory shaft 20 is coupled to the drive shaft 18 by inserting the refractory shaft into the recess 56 of the body of the coupling 22 against the force of the springs 66. This moves the locking members 62 out of the recess 56. Then, the refractory shaft 20 is twisted until the locking members 62 are aligned with the locking recesses 64. The force of the springs 66 then snaps the locking members 62 into the locking recesses 64, which firmly couples the refractory shaft 20 with the coupling 22 preventing radial or axial movement of the refractory shaft relative to the coupling. The refractory shaft of the gas dispersing device 10 is then lowered into the molten metal 14 such as via a hoist or drive connected to the support structure 26. Operating the motor 24 drives the drive shaft 18 and, in turn via the coupling 22, the refractory shaft 20, which rotates the rotor 28 in the molten metal 14. The gas source 122 directs gas 12 and/or solid material along the conduit 128 to the casing 110 of the rotary union where the material travels into the passage 114 of the rotatable member 112, down the passage 46 of the drive shaft 18, through the central opening 44 of the coupling 22 and along the passageway 96 of the rod 94 aligned with the central opening, and along the passageway 48 of the refractory shaft 20 at the lower end of which the gas is dispersed by the rotor into the molten metal. The refractory shaft and rotor can be quickly replaced when desired by lifting the device 10 upwardly moving the refractory shaft out of the molten metal and applying sufficient downward force on the refractory shaft to overcome the spring force.

Figure 3:
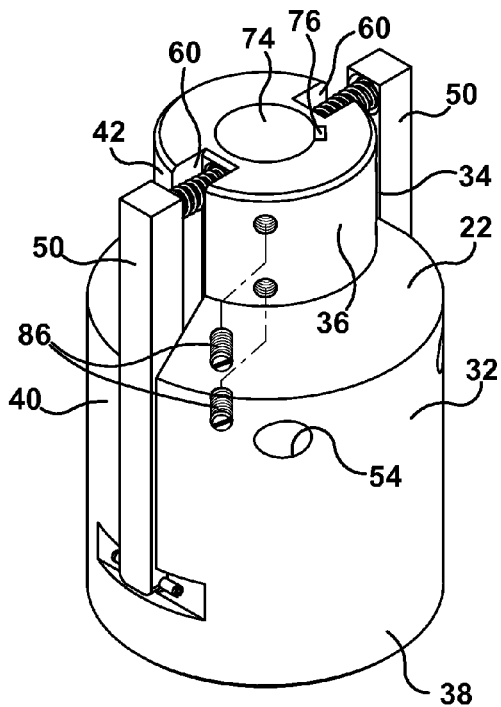
FIG. 3 is a perspective view of a coupling member for coupling a drive shaft and a refractory shaft in the device of FIG. 1.
Figure 4:
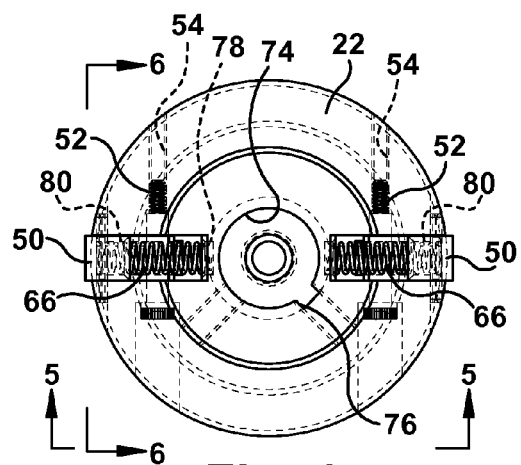
FIG. 4 is a top view of the coupling of FIG. 3.
Figure 5:
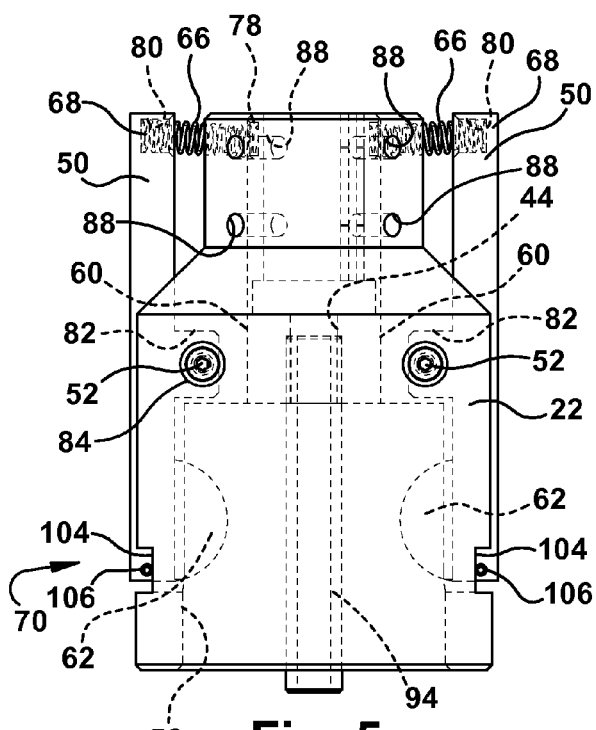
FIG. 5 is an elevational view of the coupling as seen along the plane designated 5-5 in FIG. 4.
Figure 6:
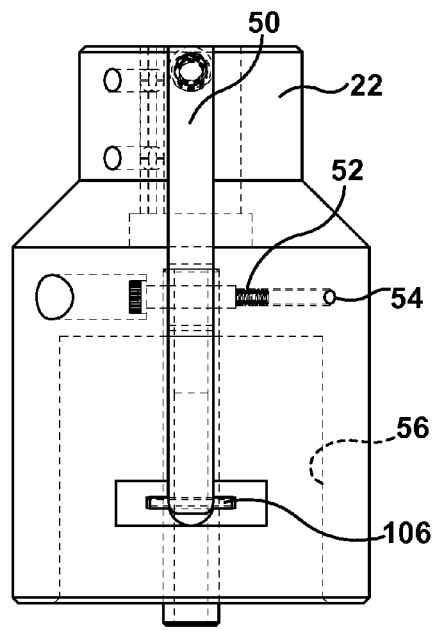
FIG. 6 is an elevational view as seen along the plane designated 6-6 in FIG. 4.
Figure 9:
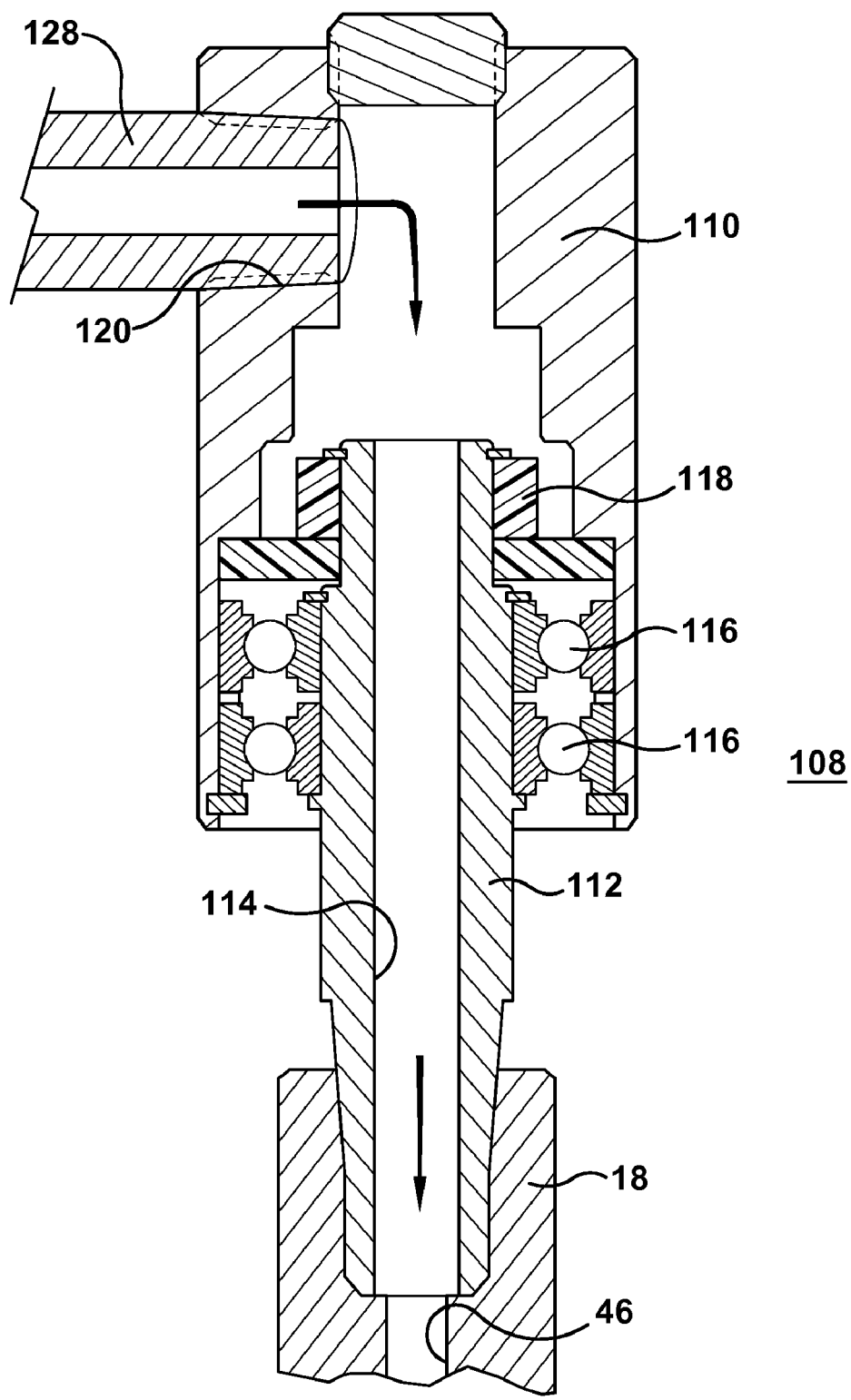
FIG. 9 is a detail view of a rotary union as outlined in FIG. 2.
Figure 10:
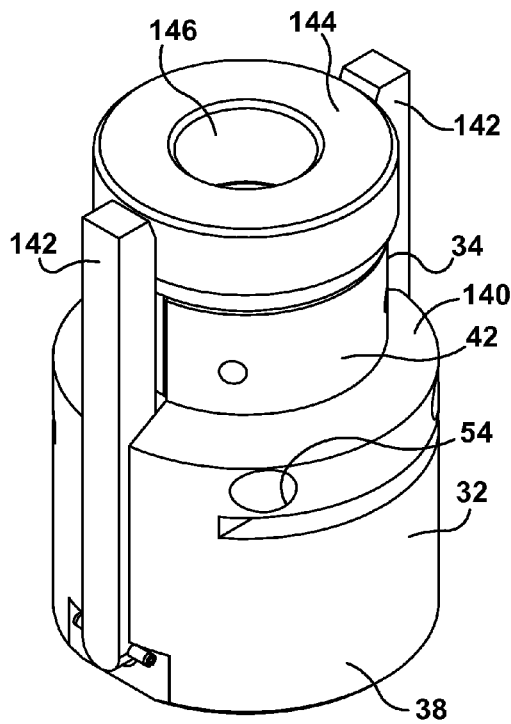
FIG. 10 is a perspective view of another embodiment of a coupling of this disclosure.
Figure 11:
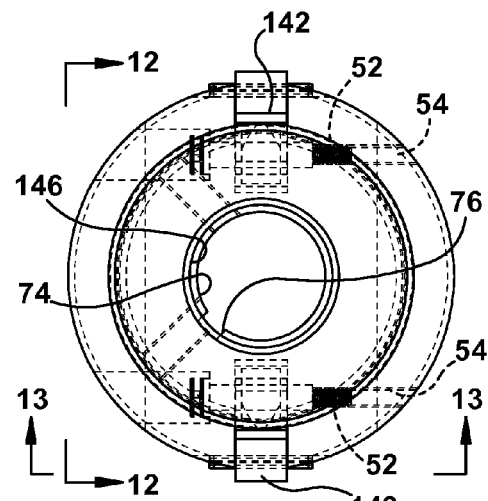
FIG. 11 is a top plan view of the coupling of FIG. 10.
Figure 12:
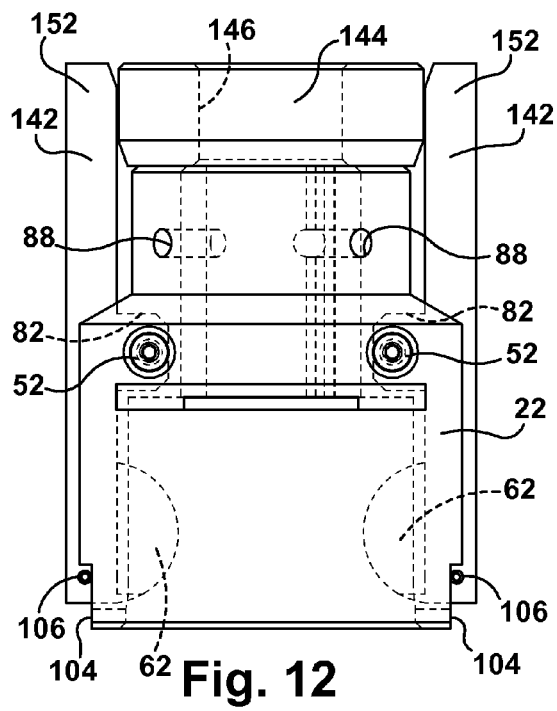
FIG. 12 is a view along the plane designated 12-12 in FIG. 11.
Figure 13:
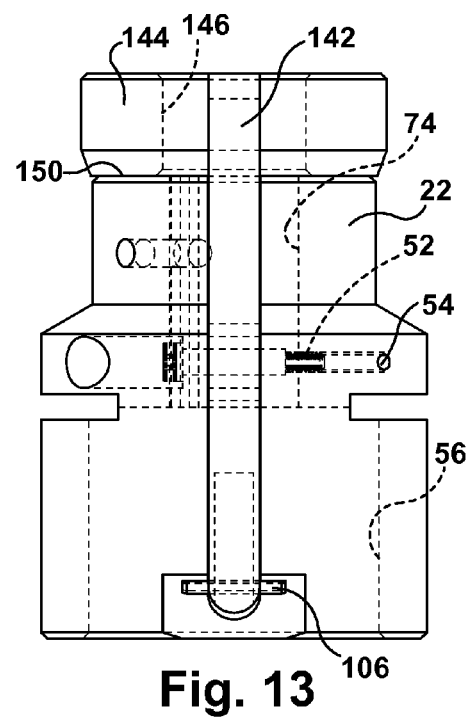
FIG. 13 is a view along the plane designated 13-13 in FIG. 11.
Figure 16:
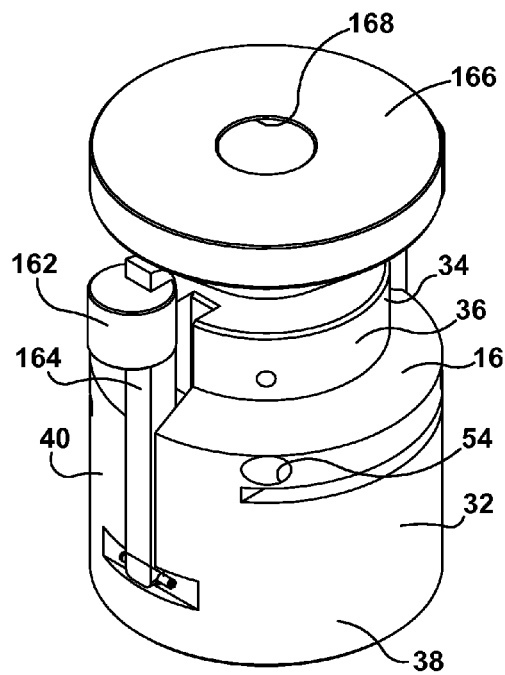
FIG. 16 is a perspective view of another embodiment of a coupling of this disclosure.
Figure 17:
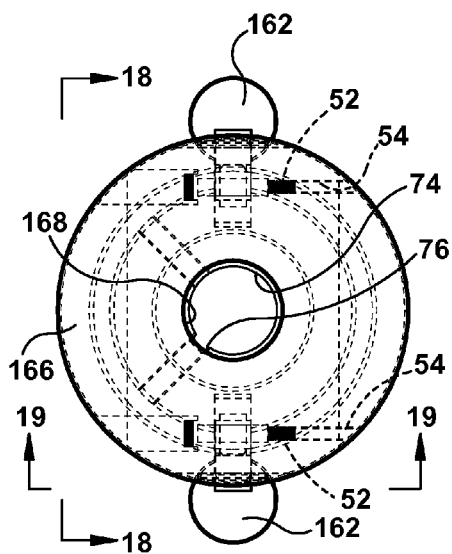
FIG. 17 is a top plan view of the coupling of FIG. 16.
Figure 18:
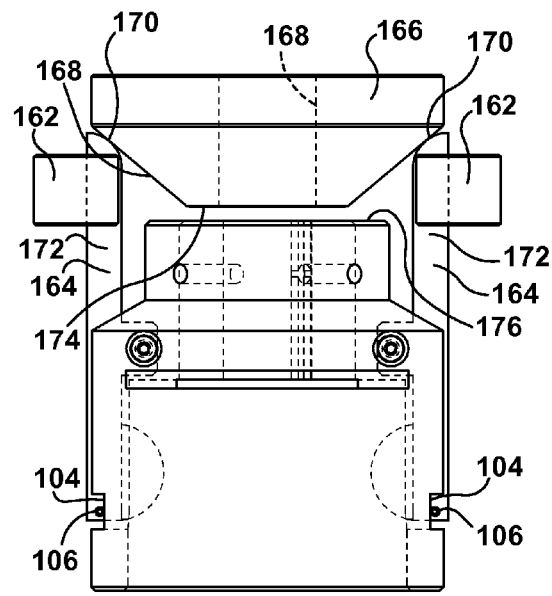
FIG. 18 is a view along the plane designated 18-18 in FIG. 17.
Figure 19:
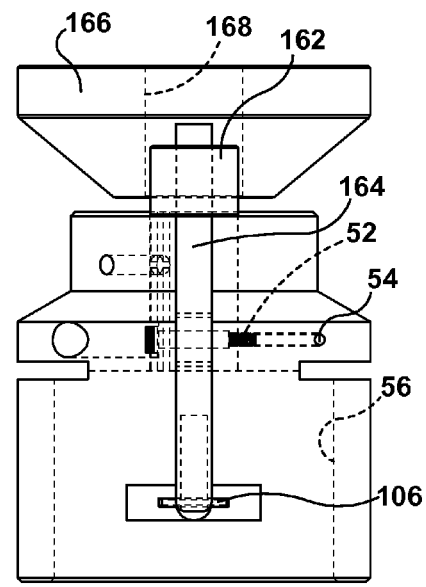
FIG. 19 is a view along the plane designated 19-19 in FIG. 17.

Each of the coupling assemblies described in this disclosure can be used for delivering gas and/or flux to the molten metal through passageways in the drive shaft, coupling and refractory shaft and out passageways of the rotor or impeller. Alternatively, the couplings can operate in mixing devices such as for scrap charging, and molten metal pumps in which the impeller or rotor rotates within the confines of a base suspended in the molten metal by support structure, in which case the mixing device and pump have no ability to direct gas and/or flux along the drive shaft, coupling and refractory shaft. For example, the coupling assembly shown in FIGS. 3-8 is adapted to be used to deliver gas and/or flux, but can be made for use in a mixing device or pump that does not direct gas and/or flux into the molten metal as by removing the threaded tube 94 and threaded opening 100 in the coupling body. There also would be no passageways in the drive shaft or refractory shaft and no gas source. Similarly, although the couplings shown in FIGS. 10-21 are suitable for use in a device or pump in which gas and/or flux is not directed into the molten metal, they can be altered by inserting a threaded opening in the coupling body and a threaded tube received in this opening fitting within the gas passageway of the refractory shaft, the drive shaft also including a gas passageway and the apparatus including a gas/flux source, so that the coupling assemblies are suitable for delivering gas and/or flux into the molten metal.

In this disclosure like parts of the coupling assembly are given like numbers throughout the several views. A second embodiment features a coupling assembly 16 including coupling 140 as shown in FIGS. 10-15. No springs engage lever arms 142 of the coupling. An annular counterweight 144 has a central opening 146 that receives the drive shaft 18. The part 144 is called a counterweight because it offsets any force that positions the lever arms at an inward location. A lower surface 148 of the counterweight contacts an upper surface 150 of the upper section of the coupling 140. The counterweight 144 has a diameter that fits between the lever arms in their outermost position. That is, insertion of the counterweight 144 between the lever arms 142 forces the lever arms outward, which causes the locking members 62 to be pushed into the coupling recess 56 and into engagement with the locking recesses 64 of the refractory shaft. The lever arms 142 and counterweight 144 may have any suitable taper or curvature selected by one of ordinary skill in the art in areas in which they contact each other, which facilitates operation of the coupling.

In operation of the coupling 140 of the second embodiment, the refractory shaft 20 is retained in the coupling recess 56 by virtue of the counterweight 144 forcing the lever arms 142 into their outermost positions. The locking members 62 are securely fitted into the locking recesses 64 of the refractory shaft 20. The drive shaft 18 rotates the coupling 140 which rotates the refractory shaft 20 and the rotor or impeller 28 on the end of the shaft. During rotation of the coupling gravity keeps the counterweight 144 located in a downward position in contact with or near the upper surface of the upper surface 150 of the coupling. The impeller can be rotated within a pump base having a volute or nonvolute impeller chamber. Alternatively, the coupling could be used on a mixing device that stirs the molten metal such as in a scrap charging well. Gas and/or flux could be introduced into the rotary union, down the passageway of the drive shaft, through the coupling, down the passageway of the refractory shaft and out passageways of the rotor or impeller. For example, the coupling body could include a threaded opening that receives a threaded tube that is fitted inside the passageway of the refractory shaft.

When it is desired to remove the refractory shaft from the coupling, as when the rotor is worn or damaged, the refractory shaft and impeller are removed from the molten metal. The counterweight 144 is pried up from contact or proximity to the coupling so it clears the lever arms 142. Upper portions of the lever arms 142 are then pushed inward, which by pivoting of the lever arms moves the locking members 62 out of the locking recesses 64 and out of the coupling recess 56. The refractory shaft 20 can then be removed from the coupling 140.

To connect the refractory shaft 20 to the coupling 140, the refractory shaft is moved into the coupling recess 56 while the locking members 62 are out of the coupling recess or at least do not impede the travel of the refractory shaft into the coupling recess. Then, the counterweight 144 is pushed downward along the drive shaft between the lever arms so as to pivot the lever arms, thereby moving the locking members into the coupling recess and into engagement with the locking recesses of the refractory shaft. The refractory shaft is now secured to the coupling to enable the impeller to be rotated in the molten metal upon rotation of the drive shaft.

A third embodiment of the coupling assembly 16 features a coupling 160 as shown in FIGS. 16-21. Weights 162 are located at the upper end of lever arms 164. The weights 162 can be brazed onto the lever arms. No springs engage the lever arms in this coupling. An annular counterweight 166 has a central opening 168 that receives the drive shaft 18. The counterweight 166 has a sloped side surface 168 that engages an arcuate surface 170 formed on each end of the lever arms while the drive shaft is rotating as well as when the motor is off and the refractory shaft is being inserted into or removed from the coupling. The weights 162 urge the locking members (e.g., Woodruff keys) into the recess 56 (i.e., into the locking recesses 64 formed in the refractory shaft 20) upon pivoting of the lever arms, so as to prevent removal or downward movement of the refractory shaft 20 from the recess 56. When the drive shaft 18 is rotating a centrifugal force on the weights 162 urges them outward, which by pivoting of the lever arms moves them upward along the sloped surface 168 of the counterweight (i.e., the counterweight may move downward). This forces the locking members 62 tightly into the locking recesses 64. When the refractory shaft 20 is being inserted into the recess 56 of the coupling 160, the locking members 62 are moved out of the recess 56, which moves upper ends 172 of the lever arms inward and moves the arcuate surfaces of the lever arms toward the bottom of the counterweight 166 along its sloped surface, raising the counterweight, or the counterweight may be raised by hand or using a tool.

The sloped side surface of the counterweight in this embodiment and the arcuate surfaces of the lever arms that contact it may be machined to have a fine surface finish so that there is no undue friction between the counterweight and the lever arms. For example, the side surface of the counterweight and can have a surface roughness of 125 microinch (rms).

In operation of the third coupling assembly, the refractory shaft 20 is retained in the coupling recess 56 by virtue of the counterweight 166 forcing the lever arms 164 outward. The locking members 62 are fitted into the locking recesses 64 of the refractory shaft 20. The drive shaft 18 rotates the coupling 160 which rotates the refractory shaft 20 and the rotor or impeller 28 on the end of the shaft. During rotation of the coupling, gravity keeps a bottom surface 174 of the counterweight 166 located in a downward position in contact with or near upper surface 176 of the upper section of the coupling. The impeller can be rotated within a pump base having a volute or nonvolute impeller chamber. Alternatively, the coupling assembly could be used in a mixing device for stirring the molten metal such as in a scrap charging well. Gas and/or flux could be introduced into the rotary union, down the passageway of the drive shaft, through the coupling, down the passageway of the refractory shaft and out passageways of the impeller. For example, the coupling body could include a threaded opening that receives a threaded tube that is fitted inside the passageway of the refractory shaft.

Centrifugal force on the weights 162 can urge the free upper ends 172 of the lever arms outward, which may move their arcuate surfaces further upward along the tapered surface 168 of the counterweight 166 (i.e., the weight 166 may move down). If the lever arms are already in their outermost positions upon insertion of the counterweight against the coupling, then this position is maintained by the centrifugal force applied to the weights at the free ends of the lever arms throughout operation of the device.

When it is desired to remove the refractory shaft 20 from the coupling 160, as when the rotor is worn or damaged, the refractory shaft and rotor are removed from the molten metal. The counterweight 166 is moved upward so that the arcuate surfaces 170 move toward the bottom surface 174 of the counterweight 166. This enables the lever arms 164 to be able to pivot, thereby moving the locking members 62 out of engagement with the locking recesses 64 and out of the coupling recess 56. The refractory shaft 20 may now be moved out of the coupling recess 56.

To connect the refractory shaft 20 to the coupling 160, the refractory shaft is moved into the coupling recess 56 while the locking members 62 are out of the coupling recess 56 or at least do not impede the travel of the refractory shaft into the coupling recess. Then, the counterweight 166 is pushed downward along the drive shaft between the lever arms so as to move the locking members 62 into the coupling recess 56 and into or near to engagement with the locking recesses 64 of the refractory shaft 20. The refractory shaft 20 is now secured to the coupling 160, or nearly fully secured to the coupling, to enable the impeller 28 to be rotated in the molten metal upon rotation of the drive shaft 18. The connection between the locking members 62 and locking recesses 64 can be made tighter upon rotation of the coupling member 160 and centrifugal force applied outwardly against the weights 162 of the lever arms 164, which can urge the lever arms into their outermost position and the locking members into tight engagement with the locking recesses.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A coupling assembly for coupling a drive shaft and refractory shaft, comprising:
    a drive shaft having an upper end and a lower end and being adapted to be rotated by a motor at said upper end;
    a rotatable refractory shaft having an upper end and a lower end, said lower end of said shaft being adapted to be connected to a rotor, locking recesses formed in said upper end of said refractory shaft, said refractory shaft being formed of refractory material; and
    a rotatable coupling comprising:
        a body having an exterior surface, an upper end and a lower end,
        a device for affixing said lower end of said drive shaft to said upper end of said body,
        lever arms fastened to said body,
        pivots disposed in said body about which said lever arms are pivoted,
        a recess in said lower end of said body adapted for receiving said upper end of said refractory shaft and openings in said body extending from said exterior surface to said recess,
        each of said lever arms including a protruding locking member positioned in said opening in said coupling body, each of said locking members being adapted to engage one of said locking recesses of said refractory shaft, and
        a device that exerts a force against said lever arms forcing said locking members into said locking recesses.

2. The coupling assembly of claim 1 wherein said device that exerts said force against said lever arms includes an annular weight member disposed around said drive shaft in contact with upper ends of said lever arms.

3. The coupling assembly of claim 2 wherein said device the exerts said force against said lever arms includes a weight member disposed on the end of each of said lever arms remote from said locking members.

4. The coupling assembly of claim 3 wherein each said end of said lever arms includes an arcuate surface and said annular weight member includes a sloped surface in contact with said arcuate surfaces of said lever arms.

5. The coupling assembly of claim 1 wherein said device for exerting a force against said lever arms comprises springs disposed between said upper end of said body and upper ends of said lever arms.

6. The coupling assembly of claim 1 wherein said pivots are disposed in said lower end of said body.

7. The coupling assembly of claim 1 wherein said device for affixing said lower end of said drive shaft to said upper end of said body comprises a bore formed in said upper end of said body that is dimensioned to receive said drive shaft, a keyway formed in one of said drive shaft and said body, a key that fits into said keyway formed in the other of said drive shaft and said body, and set screws in said body that extend into contact with said drive shaft.

8. The coupling assembly of claim 1 wherein said body has a lower cylindrical section and an upper cylindrical section, said lower section having a larger diameter than said upper section.

9. The coupling assembly of claim 1 wherein said locking member is a Woodruff key and said locking recess is configured to receive said Woodruff key.

10. The coupling assembly of claim 1 comprising stop members each adapted to limit movement of one of said lever arms into said recess.

11. The coupling assembly of claim 10 wherein said stop members comprise a flat portion formed in the exterior surface of said body and a pin extending through a lower end of each of said arms that engages said flat portion.

12. The coupling assembly of claim 1 wherein said drive shaft and said refractory shaft each includes a passageway extending therethrough and said body comprises a central opening aligned with said passageways in said drive shaft and said refractory shaft.

13. The coupling assembly of claim 12 comprising a hollow rod fastened to said body extending in said recess in communication with said central opening, said rod being received in said passageway of said refractory shaft.

14. A device for introducing gas into molten metal comprising said coupling assembly of claim 1, a motor connected to said drive shaft, structure for suspending said motor above said molten metal, a rotor connected to said lower end of said refractory shaft and a gas source for providing gas to pass through said drive shaft, said coupling, and said refractory shaft and distributed by said rotor.

15. The device of claim 14 comprising a rotary union fastened to said drive shaft comprising a casing, a rotatable member having a gas passageway and connected to said upper end of said drive shaft, bearings for rotatably supporting said rotatable member in said casing, a seal at an upper end of said rotatable member preventing gas from traveling outside of said rotatable member and an opening in said casing for introducing gas into said casing into said passageway of said rotatable member.

16. A coupling assembly for coupling a drive shaft and refractory shaft used to introduce gas into molten metal comprising:
　a drive shaft having an upper end and a lower end and being adapted to be rotated by a motor at said upper end, said drive shaft having a passageway extending therethrough;
　a rotatable refractory shaft having an upper end and a lower end, said lower end of said refractory shaft being adapted to be connected to a rotor, locking recesses formed in said upper end of said refractory shaft, said refractory shaft being formed of refractory material and having a passageway extending therethrough; and
　a rotatable coupling comprising:
　　a body having an exterior surface and a central opening aligned with said passageways in said drive shaft and said refractory shaft,
　　a device for affixing said lower end of said drive shaft to said upper end of said body,
　　lever arms fastened to said body,
　　pivots disposed in said body about which said lever arms are pivoted,
　　a recess in said body adapted for receiving said upper end of said refractory shaft and openings in said body extending from said exterior surface to said recess,
　　each of said lever arms including a protruding locking member positioned in said opening in said body, each of said locking members being adapted to engage one of said locking recesses of said refractory shaft,
　　a device that exerts a force against said lever arms forcing said locking members into said locking recesses, and
　　stop members each adapted to limit movement of one of said lever arms into said coupling recess.

17. The coupling assembly of claim 16 wherein said device that exerts a force against said lever arms includes an annular weight member disposed around said drive shaft in contact with upper ends of said lever arms.

18. The coupling assembly of claim 17 wherein said device that exerts a force against said lever arms includes a weight member disposed on said end of each of said lever arms remote from said locking members.

19. The coupling assembly of claim 18 wherein each said end of said lever arms includes an arcuate surface and said annular weight member includes a sloped surface in contact with said arcuate surfaces of said lever arms.

20. The coupling assembly of claim 16 wherein said device that exerts a force against said lever arms comprises springs disposed between an upper end of said body and upper ends of said lever arms.

21. The coupling assembly of claim 16 wherein said stop members comprise a flat portion formed in the exterior surface of said body and a pin extending through a lower end of each of said arms that engages said flat portion.

22. The coupling assembly of claim 16 comprising a hollow rod fastened to said body extending in said recess in communication with said central opening, said rod being received in said passageway of said refractory shaft.

23. The coupling assembly of claim 16 wherein said device for affixing said lower end of said drive shaft to said upper end of said body comprises: a bore formed in said body that is dimensioned to receive said drive shaft; a keyway formed in one of said drive shaft and said body; a key that fits into said keyway formed in the other of said drive shaft and said body; and set screws in said body that extend into contact with said drive shaft.

24. The coupling assembly of claim 16 wherein each said locking member is a Woodruff key.

25. A device for introducing gas into molten metal comprising said coupling assembly of claim 16, a motor connected to said upper end of said drive shaft, structure for suspending said motor above said molten metal, a rotor connected to said lower end of said refractory shaft and a gas source for providing gas to pass through said drive shaft, said coupling, and said refractory shaft and distributed by said rotor.

26. The device of claim 25 comprising a rotary union fastened to said drive shaft comprising a casing, a rotatable member having a gas passageway and connected to said upper end of said drive shaft, bearings for rotatably supporting said rotatable member in said casing, a seal at an upper end of said rotatable member preventing gas from traveling outside of said rotatable member and an opening in said casing for introducing gas into said casing into said passageway of said rotatable member.

27. A coupling assembly for coupling a drive shaft and refractory shaft used to introduce gas into molten metal, comprising:

a drive shaft having an upper end and a lower end and being adapted to be rotated by a motor at said upper end, said drive shaft having a passageway extending therethrough;

a rotatable refractory shaft having an upper end and a lower end, said lower end of said shaft being adapted to be connected to a rotor, locking recesses formed in said upper end of said refractory shaft, said refractory shaft being formed of refractory material and having a passageway extending therethrough; and a rotatable coupling comprising:
  a body having an exterior surface, an upper end and a lower end,
  means for affixing said lower end of said drive shaft to said upper end of said body,
  lever arms fastened to said body,
  pivots disposed in said body about which said lever arms can be pivoted,
  a recess in said lower end of said body adapted for receiving said upper end of said refractory shaft and openings in said body extending from said exterior surface to said recess,
  each of said lever arms including a protruding locking member positioned in said opening in said coupling body, each of said locking members being adapted to engage one of said locking recesses of said refractory shaft, and
  springs disposed at said upper end of said body that bias said locking members of said lever arms into said recess.

* * * * *